(12) United States Patent
Okamoto et al.

(10) Patent No.: US 8,164,266 B2
(45) Date of Patent: Apr. 24, 2012

(54) HIGH PRESSURE DISCHARGE LAMP LIGHTING APPARATUS

(75) Inventors: Tetsu Okamoto, Hyoto (JP); Hiroyuki Ishii, Hyogo (JP); Minoru Fukuda, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/591,244

(22) Filed: Nov. 13, 2009

(65) Prior Publication Data
US 2010/0127631 A1 May 27, 2010

(30) Foreign Application Priority Data
Nov. 21, 2008 (JP) ................. 2008-297735

(51) Int. Cl.
| | |
|---|---|
| H01J 7/44 | (2006.01) |
| H01J 13/46 | (2006.01) |
| H01J 17/34 | (2006.01) |
| H01J 19/78 | (2006.01) |
| H01J 23/16 | (2006.01) |
| H01J 29/96 | (2006.01) |
| H01J 17/04 | (2006.01) |
| H01J 61/04 | (2006.01) |
| H01K 1/62 | (2006.01) |
| H05B 41/16 | (2006.01) |
| H05B 41/24 | (2006.01) |
| H05B 37/02 | (2006.01) |
| H05B 39/04 | (2006.01) |
| H05B 41/36 | (2006.01) |
| G05F 1/00 | (2006.01) |

(52) U.S. Cl. ........... 315/59; 315/246; 315/291; 313/631

(58) Field of Classification Search ............. 315/86, 315/94, 111.11, 409, 35, 194, 46
See application file for complete search history.

(56) References Cited

U.S. PATENT DOCUMENTS

| 7,023,144 B2 * | 4/2006 | Suzuki et al. ............... 315/246 |
| 2005/0285535 A1 * | 12/2005 | Sugaya et al. ............. 313/631 |
| 2008/0315782 A1 * | 12/2008 | Hirao .......................... 315/224 |
| 2009/0108770 A1 * | 4/2009 | Terashima et al. ......... 315/291 |

FOREIGN PATENT DOCUMENTS

| JP | 01-298695 A | 12/1989 |
| JP | 2003-229296 A | 8/2003 |
| JP | 2006-59790 A | 3/2006 |

OTHER PUBLICATIONS

JPO Notice of Allowance, App. No. 2008-297735, Dec. 3, 2010 (3 pages).

* cited by examiner

*Primary Examiner* — Jacob Y Choi
*Assistant Examiner* — Henry Luong
(74) *Attorney, Agent, or Firm* — Rader, Fishman & Grauer PLLC

(57) ABSTRACT

A high pressure discharge lamp lighting apparatus includes a high pressure discharge lamp and a power supply apparatus, wherein in a steady state lighting operation, an alternating current of a steady state lighting frequency and alternating current of a low frequency are supplied by turns to the high pressure discharge lamp, and wherein in a small electric power lighting in which electric power to be applied is smaller than that of the steady state lighting, alternating current of a small electric power lighting frequency and direct current are supplied by turns to the high pressure discharge lamp.

1 Claim, 13 Drawing Sheets

Alternating current lighting

Direct current lighting

Alternating current lighting

Direct current lighting

Alternating current lighting

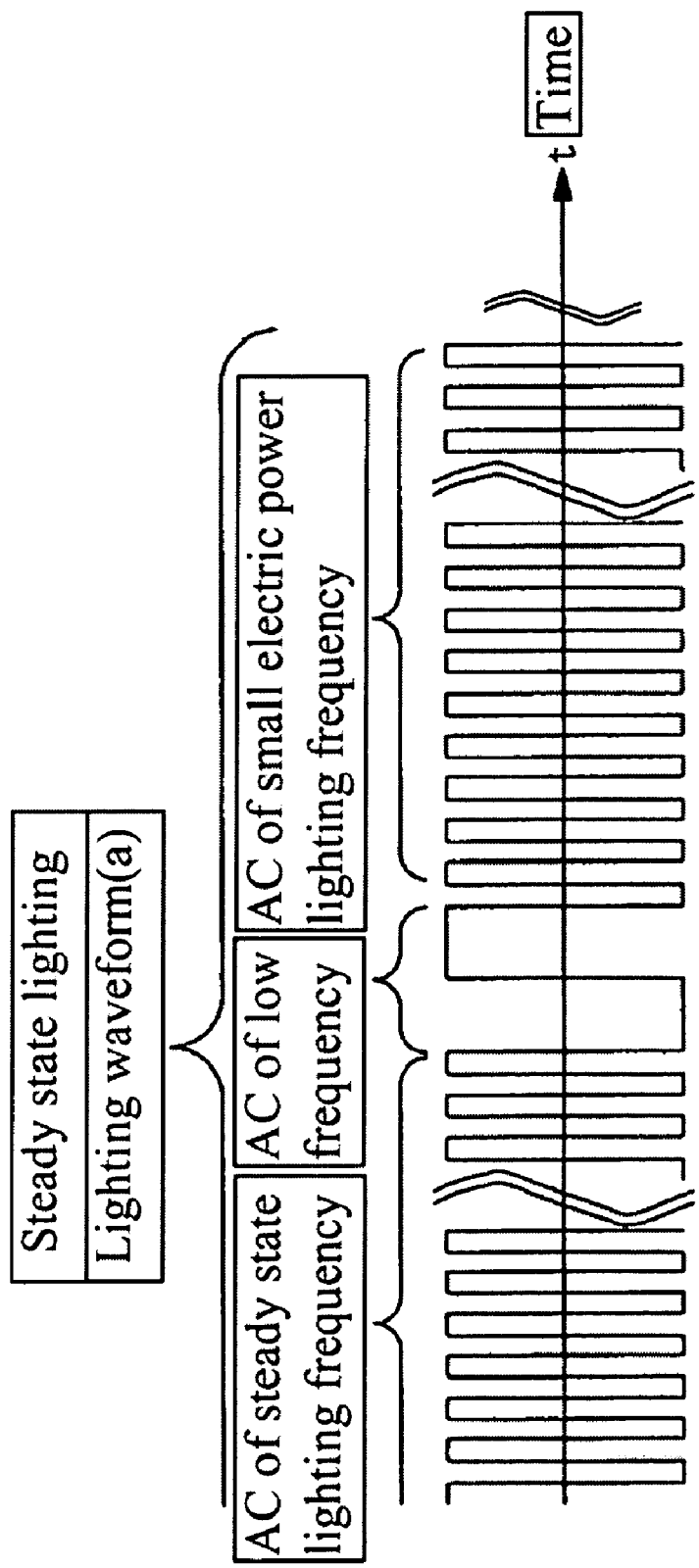

| Lighting Power (W) | | Ratio to Rated power (%) | Small power lighting Frequency (Hz) | Low Frequency · Length of frequency | Period to the following low frequency (Sec.) | Flicker | 1st projection | 2nd Projection | Deformation of electrode | Judgment |
|---|---|---|---|---|---|---|---|---|---|---|
| (1) | 230 | 100 | 370 | 46.25 Hz 1 cycle | 0.1 | No | Yes | No | No | Good |
| | 184 | 80 | 370 | 46.25 Hz 1 cycle | 0.1 | No | Yes | No | No | Good |

FIG. 7

| | Lighting Power (W) | Ratio to Rated power (%) | Small power lighting Frqncy (Hz) | DC lighting period (Sec..) | Period to the following DC (Sec.) | Flicker | 1st projection | 2nd Projection | Deformtion of electrode | Judgment |
|---|---|---|---|---|---|---|---|---|---|---|
| (2) | 184 | 80 | 50 | 1 | 4 | Yes | Yes | No | Yes | NG |
| | 138 | 60 | 50 | 1 | 4 | Yes | Yes | No | Yes | NG |
| | 92 | 40 | 50 | 1 | 4 | Yes | Yes | No | Yes | NG |
| | 81 | 35 | 50 | 1 | 4 | Yes | Yes | No | Yes | NG |
| (3) | 184 | 80 | 60 | 1 | 4 | No | Yes | Yes | No | Good |
| | 138 | 60 | 60 | 1 | 4 | No | Yes | Yes | No | Good |
| | 92 | 40 | 60 | 1 | 4 | No | Yes | Yes | No | Good |
| | 81 | 35 | 60 | 1 | 4 | Yes | Yes | No | Yes | NG |
| (4) | 184 | 80 | 500 | 1 | 4 | No | Yes | Yes | No | Good |
| | 138 | 60 | 500 | 1 | 4 | No | Yes | Yes | No | Good |
| | 92 | 40 | 500 | 1 | 4 | No | Yes | Yes | No | Good |
| | 81 | 35 | 500 | 1 | 4 | Yes | Yes | No | Yes | NG |
| (5) | 184 | 80 | 1000 | 1 | 4 | No | Yes | Yes | No | Good |
| | 138 | 60 | 1000 | 1 | 4 | No | Yes | Yes | No | Good |
| | 92 | 40 | 1000 | 1 | 4 | No | Yes | Yes | No | Good |
| | 81 | 35 | 1000 | 1 | 4 | Yes | Yes | No | Yes | NG |
| (6) | 184 | 80 | 1100 | 1 | 4 | Yes | Yes | No | Yes | NG |
| | 138 | 60 | 1100 | 1 | 4 | Yes | Yes | No | Yes | NG |
| | 92 | 40 | 1100 | 1 | 4 | Yes | Yes | No | Yes | NG |
| | 81 | 35 | 1100 | 1 | 4 | Yes | Yes | No | Yes | NG |
| (7) | 92 | 40 | 500 | 0.1 | 4 | Yes | Yes | No | Yes | NG |
| | 92 | 40 | 500 | 0.2 | 4 | No | Yes | Yes | No | Good |
| | 92 | 40 | 500 | 5 | 4 | No | Yes | Yes | No | Good |
| | 92 | 40 | 500 | 6 | 4 | Yes | No | No | Yes | NG |
| (8) | 184 | 80 | 500 | 1 | 0.5 | Yes | No | No | Yes | NG |
| | 138 | 60 | 500 | 1 | 1 | No | Yes | Yes | No | Good |
| | 92 | 40 | 500 | 1 | 100 | No | Yes | Yes | No | Good |
| | 81 | 35 | 500 | 1 | 110 | Yes | Yes | No | Yes | NG |

FIG. 8

HIGH PRESSURE DISCHARGE LAMP LIGHTING APPARATUS

CROSS-REFERENCES TO RELATED APPLICATION

This application claims priority from Japanese Patent Application Serial No. 2008-297735 filed Nov. 21, 2008, the contents of which are incorporated herein by reference in its entirety.

TECHNICAL FIELD

The present invention generally relates to a high pressure discharge lamp lighting apparatus. In particular, the present invention relates to a high pressure discharge lamp lighting apparatus having a high pressure discharge lamp in which 0.20 mg/mm3 of mercury is enclosed and the pressure thereof at time of lighting becomes 200 atmospheric pressure or more, and a power supply apparatus therefor.

BACKGROUND

Conventionally, a high pressure discharge lamp lighting apparatus having a high pressure discharge lamp in which 0.20 mg/mm3 of mercury is enclosed and the pressure thereof at time of lighting becomes 200 atmospheric pressure or more, and a power supply apparatus therefor, is known. In such a high pressure discharge lamp lighting apparatus, during a lighting operation, a projection is formed at the tip of an electrode(s) of a high pressure discharge lamp by a special lighting method, so that arc discharge is stabilized with this projection which serves as a starting point, thereby preventing generation of a flicker. This special lighting method is described in Japanese Patent Application Publication No. 2006-59790, wherein alternating current with a frequency selected from a range of 60-1,000 Hz as a steady state lighting frequency is supplied to such a high pressure discharge lamp, and when frequency of alternating current which is lower than the steady state lighting frequency and is selected from a range of 5-200 Hz, is called a low frequency, the alternating current with the low frequency, in which a length thereof is a half cycle or more to five or less cycle, is inserted in the alternating current of the steady state lighting frequency at an interval selected from a range of 0.01-120 seconds, so that the alternating current of the steady state lighting frequency and the alternating current of the low frequency are applied by turns so as to turn on the lamp.

In many of projector apparatuses using such a high pressure discharge lamp lighting apparatus, a user can arbitrarily switch between a normal mode which turns on a lamp with rated power, and an economic mode in which an operation is performed with lower electric power. Electric power in a conventional economic mode is generally about 80% of electric power in the normal mode. Furthermore, in recent years, there are use needs of a super economic mode in which an operation is performed at 80% or less of electric power in the normal mode, for example, 60%-40%, or a brightness adjustment mode using a timing function in which an input electric power to a lamp is controlled so as to be low, according to a screen, in order to raise a contrast ratio.

In recent years, a high pressure discharge lamp lighting apparatus generally has both the "normal mode" and "economic mode." Therefore, in the present specification, a lighting operation in which a lamp is turned on in the "normal mode" and "economic mode" is referred to as a steady state lighting (operation). Moreover, since electric power in the "super economic mode" is smaller than that in the steady state lighting, and also the electric power in the "brightness adjustment mode" becomes smaller than that at time of the steady state lighting, a lighting operation in which a lamp is turned on in the "super economic mode" and the "brightness adjustment mode" is hereinafter referred to as a small electric power lighting.

SUMMARY

In the technology disclosed in Japanese Patent Application Publication No. 2006-59790, when a high pressure discharge lamp is turned on in the "super economic mode" and "brightness adjustment mode," the temperature of electrodes decreases with decreasing lighting electric power so that the thermionic emission from the electrodes becomes insufficient, whereby an arc luminescent spot is not stabilized so that a so-called flicker occurs. The principle of generation of the flicker phenomenon will be explained, referring to FIGS. 9A, 9B and 9C, which are schematic diagrams of electrodes, wherein a projection 21 is formed at the tip of a sphere section 20a of each electrode 20.

FIG. 9A schematically shows a state of an arc at time a lamp is turned on in the normal mode or economic mode. The arc is stabilized and discharged between the projections formed at the tips of the electrodes, in which the flicker is not noticed. FIG. 9B schematically shows a state of arcs just after switching from the normal mode or economic mode to the super economic mode or brightness adjustment mode. The temperature of electrodes decreases with decreasing lighting electric power so that the thermionic emission from the electrodes becomes insufficient, whereby an arc luminescent spot is not stabilized so that a flicker occurs. FIG. 9C schematically shows a state of arcs wherein the lamp is continuously turned on while the flicker occurs in the super economic mode or brightness adjustment mode. Such a flicker is generated if the electrode temperature is low. If the electrode temperature is appropriate so that such a flicker is not generated, although a halogen cycle acts due to halogen gas enclosed in an electric discharge container so that evaporated tungsten returns to the electrodes again. However, in this state, since the electrode temperature is low, a halogen cycle may not act so that an electrode surface is corroded thereby causing deformation of the electrodes.

As mentioned above, in an extra-high voltage discharge lamp in which 0.20 mg/mm3 of mercury is enclosed and the inner pressure becomes 200 or more atmospheric pressure at time of lighting, a flicker occurs in a small electric power lighting operation, so that it is not possible to carry out stable lighting.

In view of the background, an object of the present invention is to prevent generation of the so-called a flicker in an extra-high pressure discharge lamp containing 0.20 mg/mm3 of mercury by stabilizing the position of an arc luminescent spot at time of such a small electric power lighting operation The above mentioned problem is solved by a high pressure discharge lamp lighting apparatus comprising a high pressure discharge lamp including a pair of electrodes, in which the electrodes are arranged so as to face each other at an interval of 2.0 mm or less in an electric discharge container made of quartz glass, and a projection is formed at a tip of each of the electrodes, wherein 0.20 mg/mm3 or more of mercury and halogen in a range of 10-6 to 10-2 μmol/mm3 is enclosed in the electric discharge container; and a power supply apparatus which supplies an alternating current to the discharge lamp, wherein the power supply apparatus supplies an alternating current and a direct current to the high pressure discharge lamp, so as to light the discharge lamp in a manner set forth below.

In a steady state lighting operation (in which the lamp is lighted with electric power which is larger than 80% of the rated electric power), an alternating current of a steady state lighting frequency and an alternating current of a low frequency are supplied by turns to the high pressure discharge lamp. The steady state lighting frequency of the alternating current is selected from a range of 60-1000 Hz, and the low frequency of the alternating current is lower than the steady state lighting frequency of the alternating current, and is selected from a range of 5-200 Hz. A time length of the low frequency of the alternating current is a half cycle thereof or more and five cycles thereof or less, and an interval between generation of the low frequency alternating current and the following generation of low frequency alternating current is in a range of 0.01-120 seconds.

(2) In a small electric power lighting operation (in which the lamp is lighted with 80% or less of rated electric power), alternating current of small electric power lighting frequency and direct current are supplied by turns to the high pressure discharge lamp. The small electric power lighting frequency of the alternating current is selected from a range of 60-1000 Hz, and the time length of application of the direct current is in a range of 0.2-5 seconds, and an interval between generation of direct current and the following generation of direct current is in a range of 1-100 seconds.

In such a high pressure discharge lamp lighting apparatus according to the present invention, having an extra-high voltage discharge lamp in which 0.20 mg/mm3 of mercury is enclosed, it is possible to prevent generation of the so-called flicker by stabilizing the position of an arc luminescent spot at time of a small electric power lighting operation.

BRIEF DESCRIPTION OF DRAWINGS

Other features and advantages of the present high pressure discharge lamp lighting apparatus will be apparent from the ensuing description, taken in conjunction with the accompanying drawings, in which:

FIGS. 5A, 5B and 5C show an example (pattern 1) of a current waveform of a discharge lamp;

FIG. 7 shows an evaluation result at time a discharge lamp is lighted with a lighting waveform (a) of FIG. 5A in a steady state lighting operation;

FIG. 8 shows an evaluation result at time a discharge lamp is lighted with a lighting waveform (b) of FIG. 5B in a steady state lighting operation.

DETAILED DESCRIPTION

A description will now be given, referring to embodiments of the present high pressure discharge lamp lighting apparatus. While the claims are not limited to such embodiments, an appreciation of various aspects of the present high pressure discharge lamp lighting apparatus is best gained through a discussion of various examples thereof.

Figure 1:
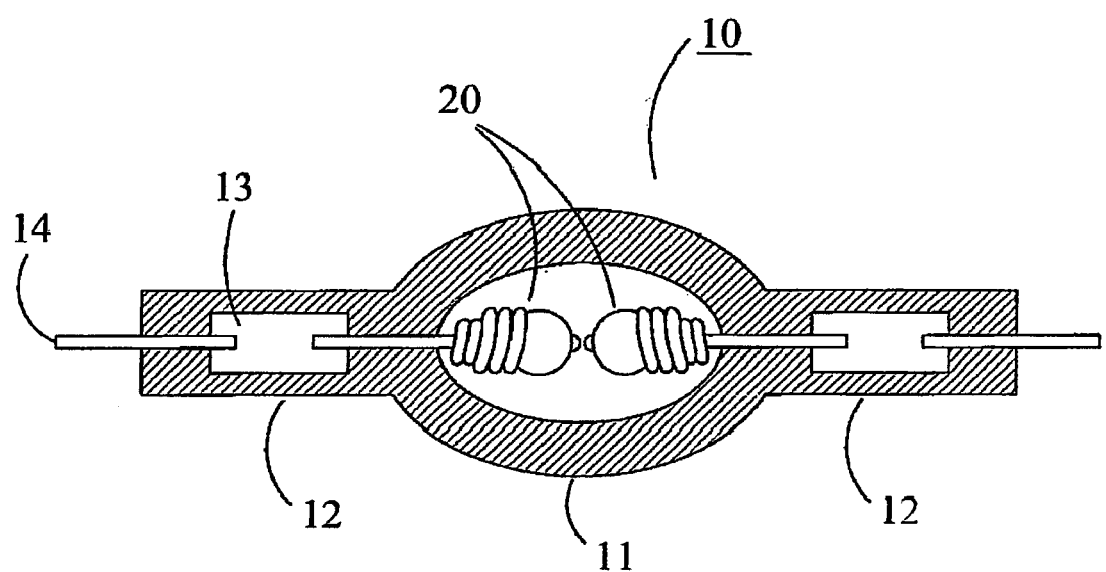
FIG. 1 shows a high pressure discharge lamp according to the present invention.

FIG. 1 shows a high pressure discharge lamp according to the present invention. A discharge lamp 10 has an approximately spherical light emission section 11 formed by an electric discharge container made of quartz glass. A pair of electrodes 20 which face each other is arranged at an interval of 2 mm or less in the light emission section 11. Moreover, sealing portions 12 are respectively formed at both ends of the light emission section 11. A metallic foil 13 for electric conduction, which is made of molybdenum, is airtightly buried in each of the sealing portions 12 by, for example, shrink sealing. An axis portion of each electrode 20 is joined to one end of the metallic foil 13. Moreover, an external lead 14 is joined to the other end of each metallic foil 13, so as to supply electric power from an external power supply apparatus. Mercury, rare gas, and halogen gas are enclosed in the light emission section 11. Mercury is enclosed in order to obtain required visible light, for example, radiation light having a wavelength of 360-780 nm, wherein the amount of the mercury to be enclosed is 0.20 mg/mm3. Although the amount of mercury to be enclosed changes depending on temperature conditions, the vapor pressure becomes very high, such as 200 or more atmospheric pressure at time of lighting. Moreover, a discharge lamp whose high mercury vapor pressure is 250 or 300 or more atmospheric pressure at time of lighting can be fabricated by enclosing more mercury, and if the mercury vapor pressure becomes high, a light source suitable for a projector apparatus can be realized.

The rare gas such as argon gas, whose amount is, for example, approximately 13 kPa, is enclosed in order to improve lighting startability. The halogen gas is enclosed therein in form of a compound of mercury or other metal with iodine, bromine, chlorine or the like. The amount of halogen gas to be enclosed is selected from a range of 10-6 to 10-2 μmol/mm3. Although the function of the halogen is to achieve a longer life span using the so-called halogen cycle, there is also an action of preventing devitrification of an electric discharge container, in case where a discharge lamp is very small and the lighting vapor pressure thereof is very high as in the present invention. The specification (numerical examples) of an embodiment of a discharge lamp is set forth below. For example, the maximum outer diameter of the light emission section is 10 mm, the distance between the electrodes is 1.0 mm, and the internal volume of the arc tube is 64.8 mm3. Rated voltage applied thereto is 80 V, and rated power applied thereto is 30 W, wherein the discharge lamp is lighted with alternating current lighting.

Moreover, this kind of discharge lamp is built in a projector apparatus for a miniaturization purpose, wherein while a severe miniaturization is required in an overall dimension, high intensity of light emission is also required. For this reason, the thermal influence on the light emission section becomes very severe. A bulb wall load value of a lamp is 0.8-2.4 W/mm2, specifically, 2.15 W/mm2. When a discharge lamp having such high mercury vapor pressure and bulb wall load value is installed in an apparatus for presentation such as a projector apparatus or an overhead projector, it is possible to provide radiation light with good color rendering property.

Figure 2:
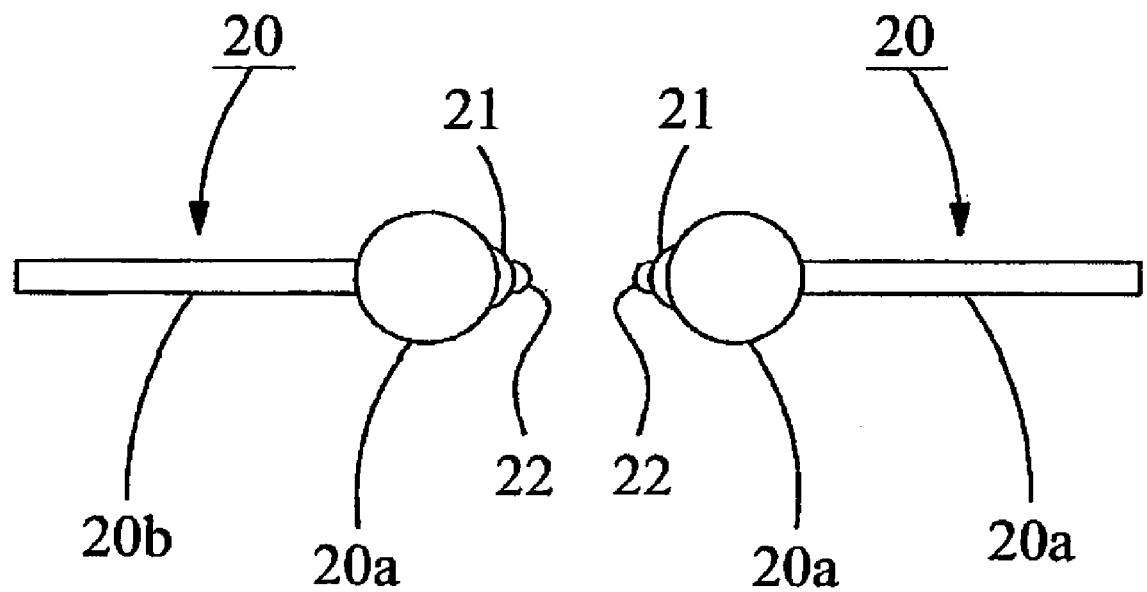
FIG. 2 is a schematic diagram showing the tips of electrodes of a high pressure discharge lamp according to the present invention.

FIG. 2 is a diagram of the electrodes and the projections wherein the tips of the electrodes 20 shown in FIG. 1 are schematically shown. Each of the electrodes 20 consists of a sphere section 20a and an axis portion 20b, and a first projection 21 and a second projection 22 are formed at the tip of the sphere section 20a of each electrode 20. Even though the second projections 22 do not exist immediately after changing from the normal mode or economic mode to the small electric power lighting, they are formed in a subsequent lighting operation. This second projections 22 are not necessarily formed in any discharge lamp. But such projections are formed if the distance between the electrodes is 2 mm or less, and a short arc type discharge lamp in which 0.20 mg/mm3 or more of mercury, rare gas, and halogen in a range of 1×10-6 to 1×10-2 μmol/mm3 is enclosed in the light emission section, is lighted.

According to the present invention, when the lamp is turned on in small electric power lighting, the second projection 22 is formed at the tip of the first projection 21 (an end portion of the first projection 21 which faces the other electrode). Although such a phenomenon, in which such a second projection 22 is formed, is not entirely clear, change of the projection of the electrode, will be explained below referring FIG. 3.

Figure 3A:
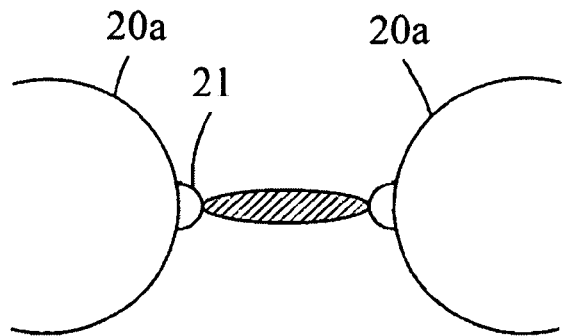
FIGS. 3A, 3B, 3C, 3D and 3E are schematic diagrams showing change of projections of electrodes of a high pressure discharge lamp according to the present invention.

(a) Alternating Current Lighting (FIG. 3A)

While the discharge lamp is turned on in the normal mode or economic mode, only the first projection exists. Since the electrode is high in temperature, most surface of the first projection is in a molten state, and since the temperature of the electrode decrease with the fall of electric power when changing to the small electric power lighting, a melting portion contracts and only a portion near the arc attachment is melted.

Figure 3B:
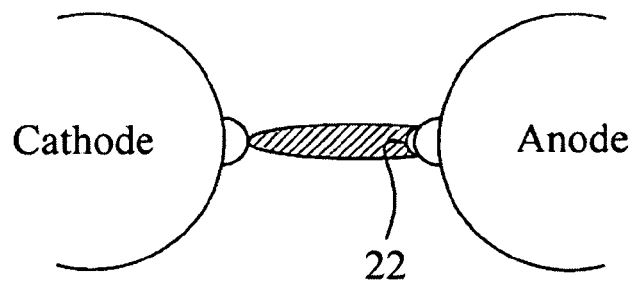

(b) Direct Current Lighting (FIG. 3B)

In the time of small electric power lighting, an alternating current of the small electric power lighting frequency selected from the range of 60-1000 Hz is supplied to the lamp, and then direct current is supplied thereto, following this alternating current. The direct current lighting period of the direct current is in a range of 0.2-5 seconds, and the interval of the direct current lighting (direct current supply interval) is in a range of 1-100 seconds. During such direct current lighting, only the first projection 21 of the electrode which is used as the anode and which is near the arc attachment is melting, and the melted portion rises due to surface tension so that the second projection 22 is formed.

Figure 3C:
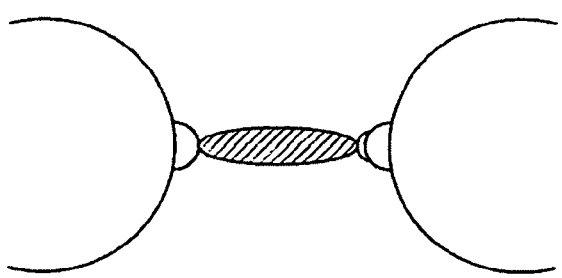

(c) Alternating Current Lighting (FIG. 3C)

After that, although the small electric power lighting continues, the operation is changed from the direct current lighting to an alternating current lighting of the small electric power lighting frequency selected from the range of 60-1000 Hz.

Figure 3D:
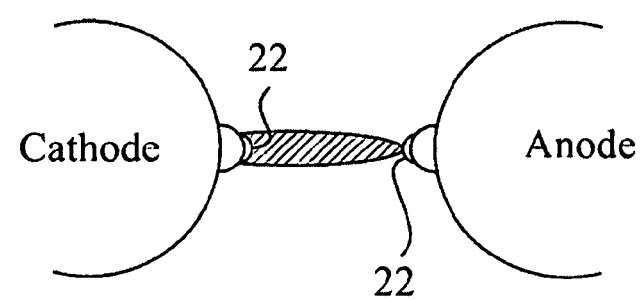

(d) Direct Current Lighting (FIG. 3D)

Although the small electric power lighting further continues after that, the operation is changed from the alternating current lighting of the small electric power lighting frequency to the direct current supply in the above mentioned lighting method. In this case, the polarity of the direct current is changed so as to supply a direct current to the electrode, so that the electrode which was a cathode in the previous direct current lighting becomes an anode. At this time, the electrode in the opposite side of the electrode which served as the anode last time, has served as an anode, and only the first projection 21 of the electrode which is near the arc attachment and is serving as the anode, is melting, whereby the melted portion rises due to surface tension, so that the second projection 22 is formed.

Figure 3E:
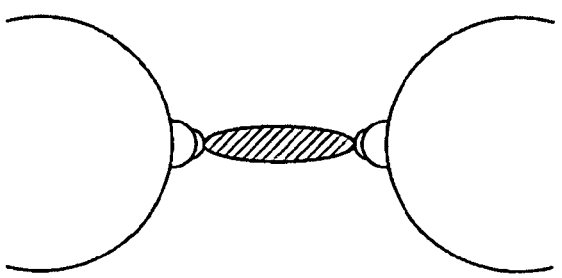

(e) Alternating Current Lighting (FIG. 3E)

Although the small electric power lighting further continues after that, the operation is changed from the direct current lighting to an alternating current lighting of a small electric power lighting frequency selected from the range of 60-1,000 Hz. It is believed that the second projection 22 is formed at the tip of the first projection 21 of each of the electrodes, by repeating the operation.

The second projections 22 formed in such a manner, disappear when the operation is changed to the normal mode or economic mode, since the temperature of the electrodes rises with a rise of electric power. After that, the second projection 22 is again formed by the above mentioned mechanism when the operation is again changed to the small electric power lighting. Furthermore, in the discharge lamp according to the present invention, the second projection 22 is formed at the tip of each first projection 21, and arc discharge takes place therefrom as the starting point, light from the arc is hardly interrupted by the sphere section 20a of the electrode, so that, there is an advantage that the use efficiency of light is improved. In addition, as shown in FIG. 2 which is a schematic diagram, usually there is an element which has a diameter larger than that of the axis portion, and which corresponds to the sphere section, at the tip of an axis portion 20b.

Figure 4:
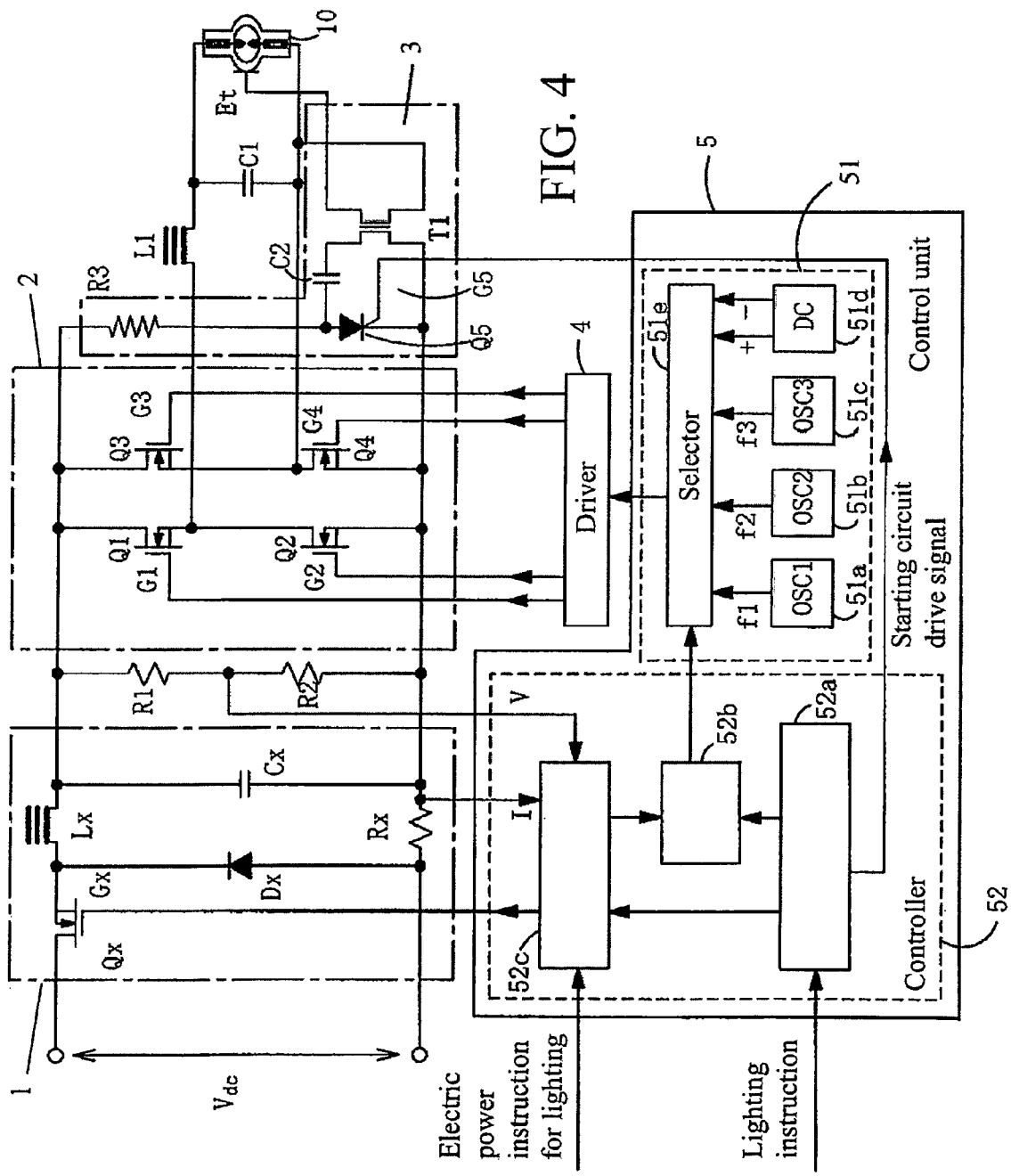
FIG. 4 shows the structure of a power supply apparatus for lighting a discharge lamp.

FIG. 4 shows the structure of a power supply apparatus for lighting the above-mentioned discharge lamp. A lighting apparatus is made up of the discharge lamp 10 and the power supply apparatus. The power supply apparatus comprises a step down chopper circuit 1 to which direct current voltage is supplied; a full bridge type inverter circuit 2 (hereinafter referred to as a "full bridge circuit") which is connected with the output side of the step down chopper circuit 1, and converts the direct current voltage to alternating voltage which is supplied to the discharge lamp 10; a coil L1 which is in series connected to the discharge lamp; a capacitor C1; a starter circuit 3; a driver 4 which drives switching elements Q1-Q4 of the full bridge circuit 2; and a control unit 5. A processor, such as a microprocessor may be used as the control unit 5, and FIG. 4 is a block diagram showing a functional structure thereof.

In FIG. 4, the step down chopper circuit 1 comprises a switching element Qx and a reactor Lx which are connected to a plus terminal of a power supply which supplies the direct current voltage to the step down chopper circuit 1; a diode Dx whose cathode side is connected to a connecting point of the switching element Qx and the reactor Lx and whose anode side is connected to a minus terminal of the power supply; a smoothing capacitor Cx which is connected to the output side of the reactor Lx; and a resistor Rx for current detection which is connected between the minus terminal of the smoothing capacitor Cx and the anode side of the diode Dx. Input direct current voltage Vdc is stepped down to a certain voltage by driving the switching element Qx at a predetermined duty ratio. A series circuit of resistors R1 and R2 for voltage detection is provided in an output side of the step down chopper circuit 1. The full bridge circuit 2 consists of the switching elements Q1-Q4 connected so as to form a bridge, in which the switching elements Q1 and Q4 and the switching elements Q2 and Q3 are turned ON by turns, so that square wave alternating voltage occurs between a contacting point of the switching elements Q1 and Q2 and a contacting point of the switching elements Q3 and Q4. The starter circuit 3 consists of a series circuit of a resistor R3 and a switching element Q5, a capacitor C2 and a transformer T1. When the switching element Q5 is turned on, electric charges charged in the capacitor C2 is discharged through the switching element Q5 and the primary side coil of the transformer T1, so that a pulse-like high voltage occurs in the secondary side of the transformer T1. This high voltage is impressed to an auxiliary electrode Et of the discharge lamp 10, thereby turning on the lamp.

In the circuit, DC (direct current) lighting can be attained by adjusting the switching cycle of the switching elements Q1-Q4 of the full bridge circuit 2. In addition, output power can be attained by adjusting the operational duty ratio of the switching element Qx of the step down chopper circuit 1. For example, the output power is 230 W in the "normal mode" of steady state lighting, and 184 W in the "economic mode" of the steady state lighting, and 140 W in small electric power lighting. The switching element Qx of the step down chopper circuit 1 is turned on/off according to the duty ratio of the gate signal Gx, whereby the electric power which is supplied to the discharge lamp 10 is changed. That is, when an electric power is raised, the duty ratio of the switching element Qx is raised, and when the electric power is decreased, the duty ratio of the switching element Qx is decreased, so that the gate signal Gx is controlled so as to be an electric power value corresponding to the inputted electric power adjustment signal value.

A control unit 5 includes a drive signal generating unit 51 and a controller 52. The drive signal generating unit 51 comprises, for example, alternating current signal generating sections 51a-51c, a direct current signal generating section 51d, and a selector 51e which selects an output(s) therefrom, wherein the outputs from the alternating current signal generating sections 51a-51c and the direct current signal generating section 51d are selectively outputted, whereby an drive signal for driving the switching elements Q1-Q4 of the full bridge circuit 2 is generated. In FIG. 4, the alternating current signal generating section 51a sends an output f1 for a steady state lighting frequency to the selector 51e. The alternating current signal generating section 51b sends a small electric power lighting frequency signal f2 for a small electric power lighting frequency to the selector 51e. The alternating current signal generating section 51c sends an output f3 of a low frequency to the selector 51e. In addition, the direct current generating section 51d send an output DC of direct current to the selector 51e. A controller 52 includes a lighting operation control section 52a which controls a lighting operation of the discharge lamp 10, and an electric power control unit 52c which drives the switching element Qx of the step down chopper circuit 1 at the set duty ratio in response to an electric power instruction for lighting from an external device, and which controls the electric power of the discharge lamp 10. Moreover, the controller 52 has a frequency selection section 52b which sends out a frequency selection instruction to the selector of the drive signal generating unit 51 according to the steady state lighting or small electric power lighting, in order to set up the drive signal of the switching elements Q1-Q4. The electric power control unit 52c detects the lamp current I from voltage between both-ends of the resistor Rx for current detection and the lamp voltage V from voltage detected by the resistors R1 and R2 for voltage detection, whereby lamp electric power is calculated, and the duty ratio of the switching element Qx of the step down chopper circuit 1 is controlled, so that the electric power is in agreement with the lighting electric power instruction. Moreover, it is determined whether an operation is steady state lighting or small electric power lighting, based on a value of lighting electric power instruction, so that a result of the judgment is sent out to the frequency selection section 52b.

Figure 5A:
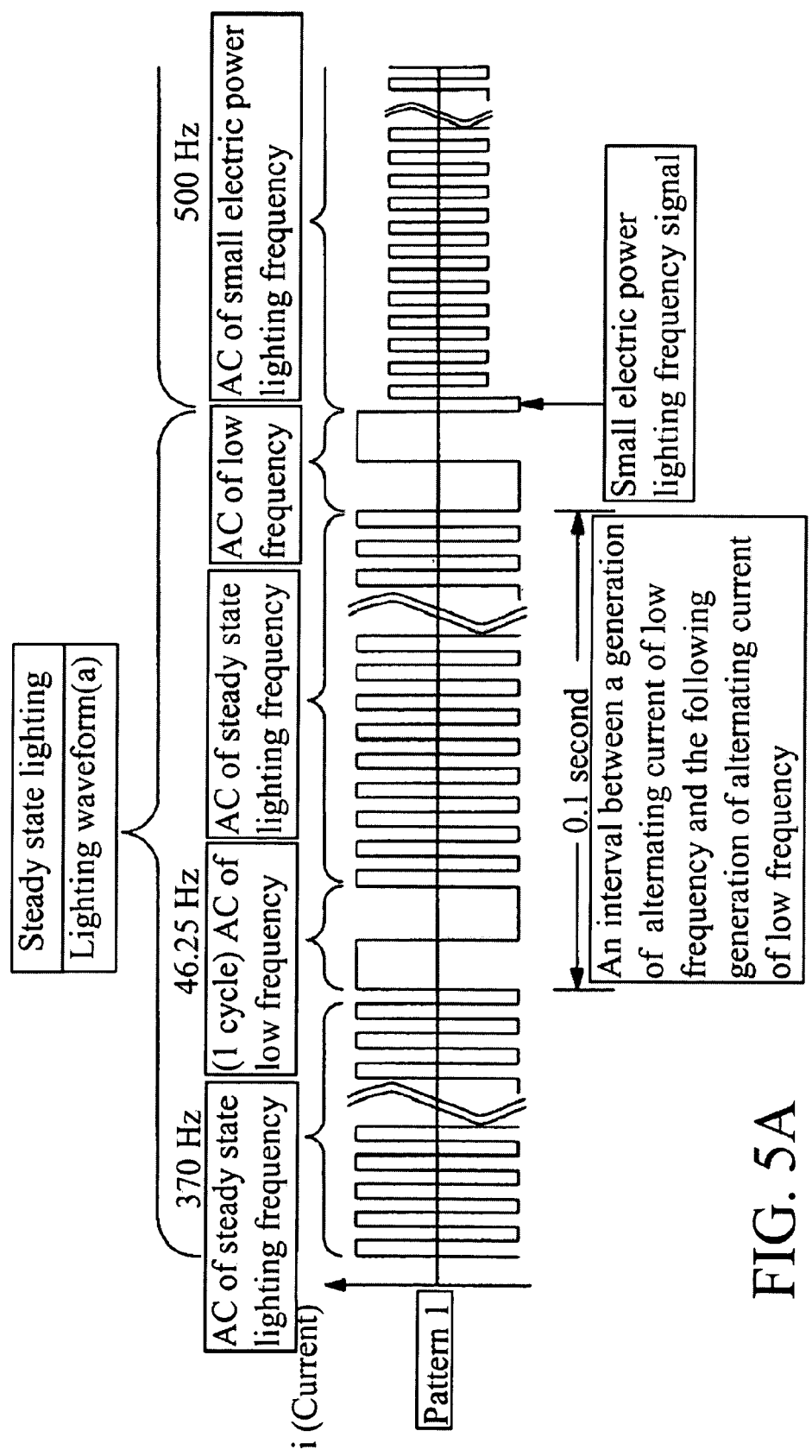
Figure 5B:
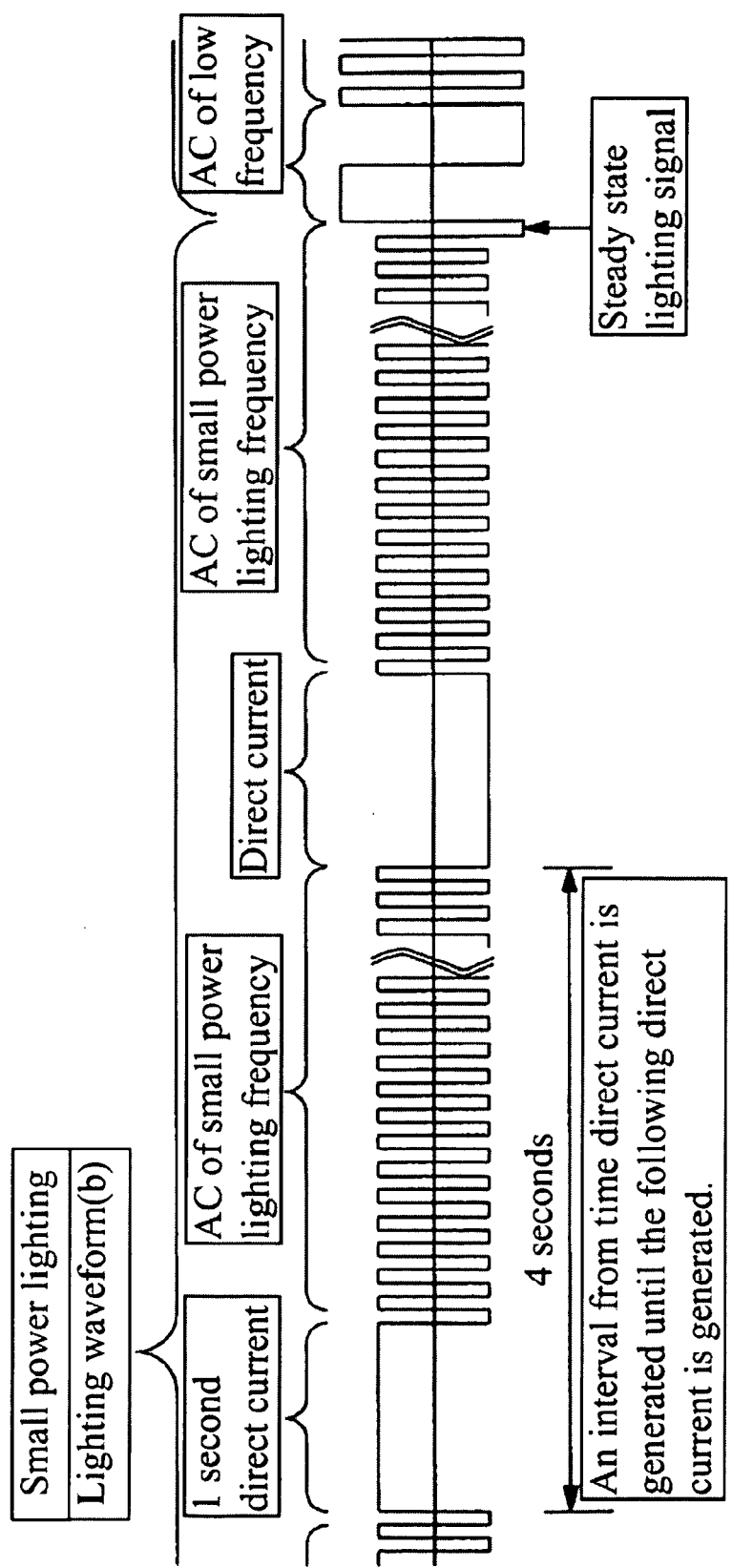
Figure 6A:
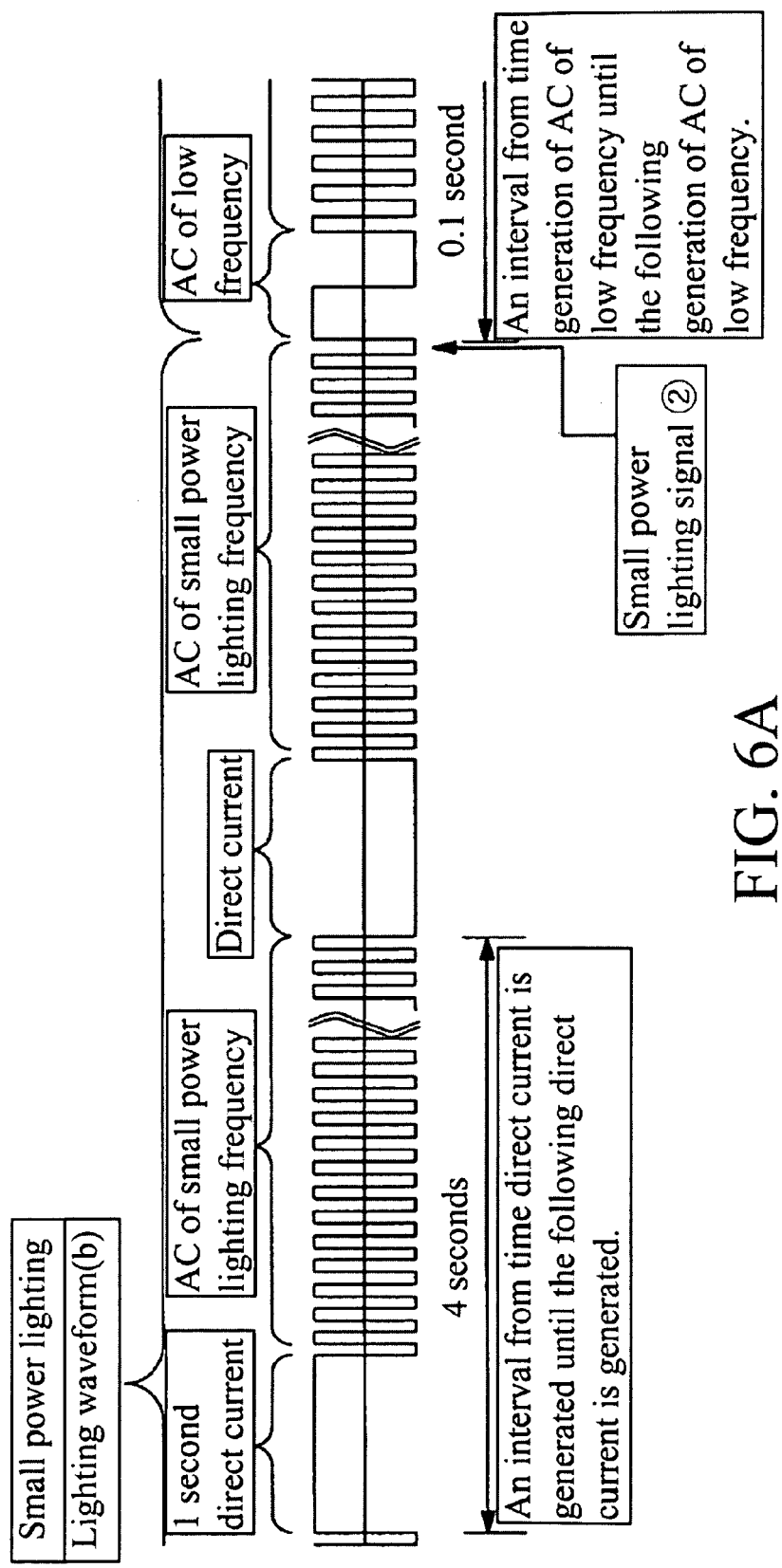
FIGS. 6A, 6B and 6C show an example (pattern 2) of a current waveform of a discharge lamp.
Figure 6B:
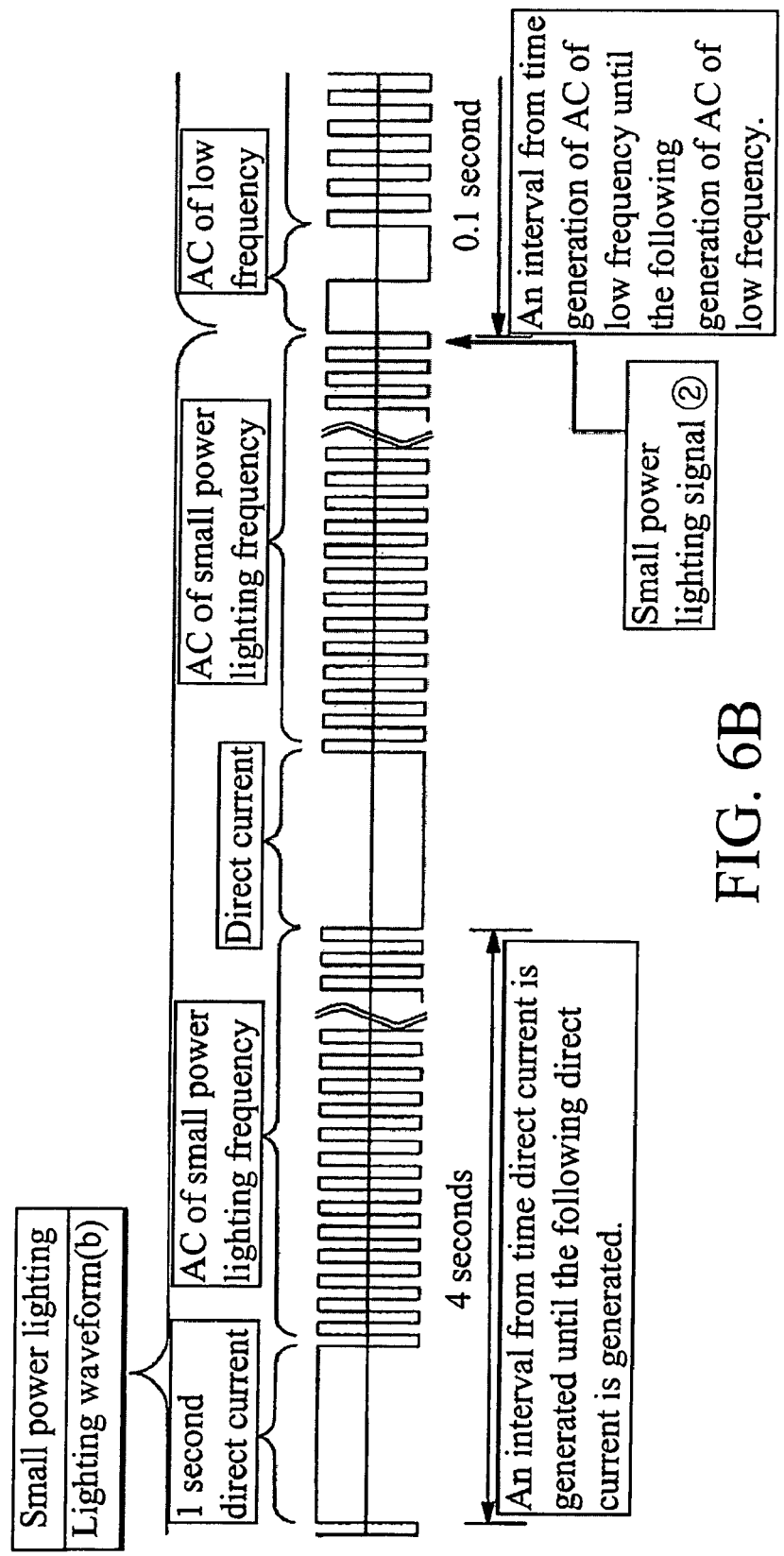
Figure 6C:
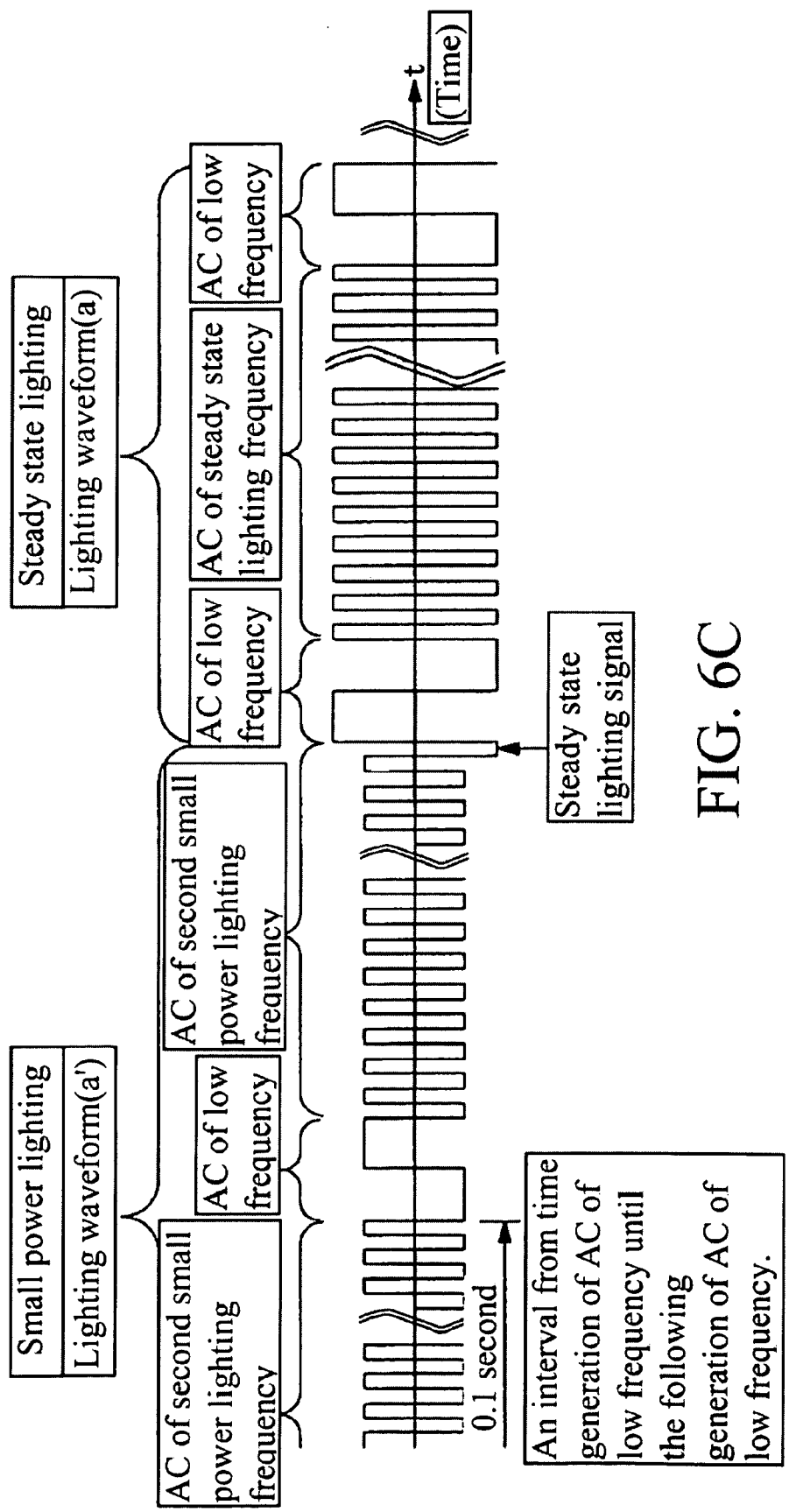
Figure 9A:
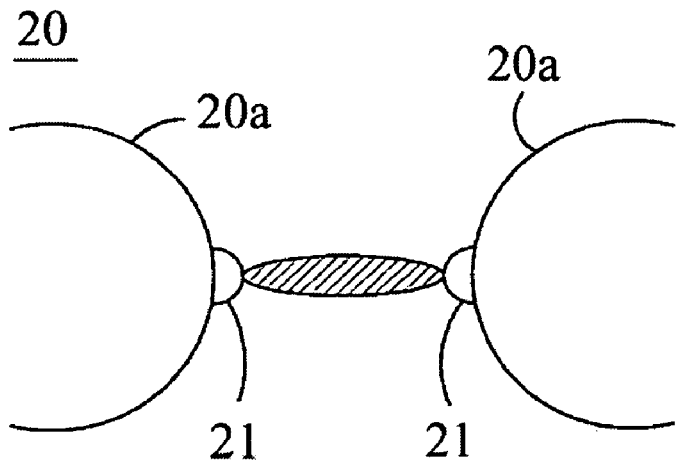
FIGS. 9A, 9B and 9C are schematic diagrams showing a state of projections of the electrodes of a high pressure discharge lamp.
Figure 9B:
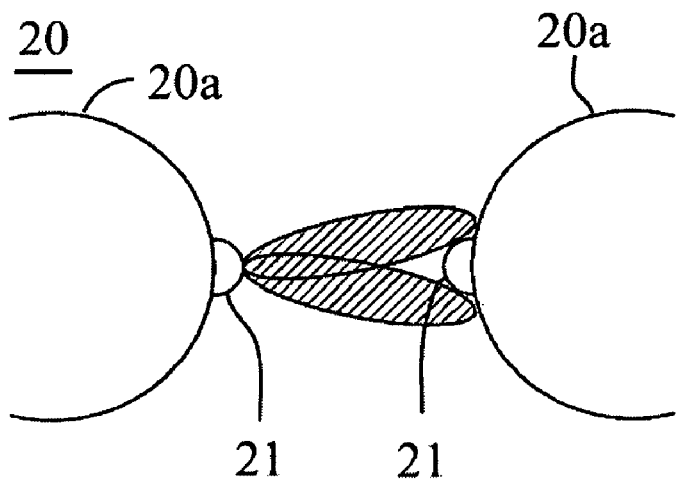
Figure 9C:
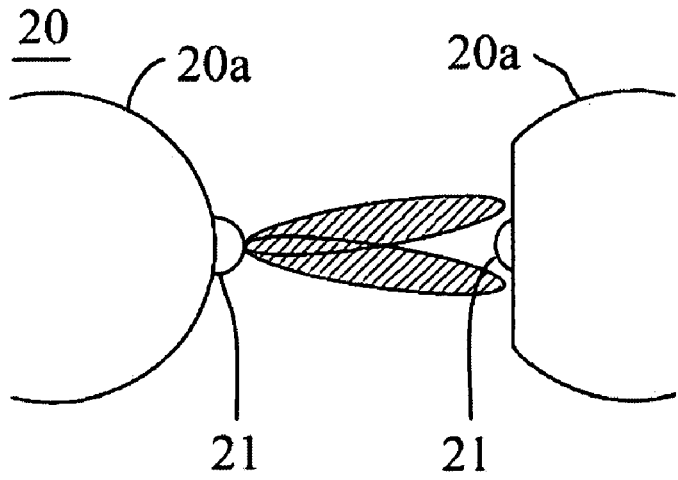

FIGS. 5A, 5B, 5C, 6A, 6B and 6C show examples of a waveform of current applied to the discharge lamp 10, wherein a vertical axis represents a current value, and a horizontal axis represents time. Specifically, FIGS. 5A, 5B and 5C show a pattern 1 which is a lighting patter, and FIGS. 6A, 6B and 6C show a pattern 2 which is another lighting pattern. In the power supply apparatus shown in FIG. 4, an operation is performed as set forth below, in which a pattern of current shown in FIGS. 5A, 5B, 5C and 6A, 6B and 6C is supplied to the discharge lamp to turn on the lamp.

When an lighting instruction is given thereto, while the electric supply to the discharge lamp 10 starts, the lighting operation control section 52a of the controller 52 generates a starting circuit drive signal, thereby triggering the starter circuit 3 so that the discharge lamp 10 is turned on.

(2) When the discharge lamp 10 is lighted up, in the electric power control unit 52c, lighting electric power is calculated from the voltage value V detected by the voltage dividing resistors R1 and R2 and the current value I detected by the resistor Rx.

(3) The electric power control unit 52c of the controller 52 controls the switching element Qx of the step down chopper circuit 1, based on a lighting electric power command signal and the calculated value of electric power, thereby controlling lighting electric power.

(4) When a lighting electric power instruction value is large in the steady state lighting (larger than 80% of the rated power of the discharge lamp), the frequency selection section 52b of the controller 52 selects an output of the alternating current signal generating section 51a and an output of the alternating current signal generating section 51c by the selector 51e of the drive signal generating unit 51, thereby outputting, by turns, the steady state lighting frequency signal f1 and the low frequency signal f3 from the selector 51e. The output of the selector 51e is given to the switching elements Q1-Q4 of the full bridge circuit 2 through the driver 4. Although the switching elements Q1-Q4 are driven by the steady state lighting frequency signal f1 (60-1000 Hz) at the time of the steady state lighting, they are driven at the low frequency signal f3 (5-200 Hz), whose frequency is lower than the steady state lighting frequency, every first predetermined time (0.01 seconds-120 seconds), for a second predetermined period (a period of half cycle to 5 cycles of the low frequency signal). Refer to the waveform at the time of steady state lighting of FIG. 5.

(5) When a lighting electric power instruction value is small (80% or less of the rated power of the discharge lamp) in small electric power lighting, the frequency selection section 52b of the controller 52 selects an output of the alternating current signal generating section 51b and an output of the direct current signal generating section 51d by the selector 51e of the drive signal generating unit 51, so as to output, by turns, the small electric power lighting frequency signal f2 and direct current voltage +V1, and −V1 from the selector 51e.

The polarity of the direct current voltage is reversed every time it is outputted. The output of the selector 51e is given to the switching elements Q1-Q4 of the full bridge circuit 2 through the driver 4. Although the switching elements Q1-Q4 are driven at the small electric power lighting frequency signal f2 (60-1000 Hz) at the time of the small electric power lighting, they are driven by the direct current voltage +V1 and −V1, wherein the polarity thereof changes by turns every third predetermined time (1-100 seconds), for a fourth predetermined period (0.2-5 seconds). Refer to a waveform at the time of the small electric power lighting of FIG. 5.

(6) In addition, when the small electric power lighting continues for a long time (for example, 3 hours or more) in the small electric power lighting operation, a second projection deforms and the lamp voltage value V rises. When the voltage value V exceeds a threshold, the frequency selection section 52b of the controller 52 selects an output of the alternating current signal generating section 51b and an output of alternating current signal generating section 51c by the selector 51e of the drive signal generating unit 51, so that the small electric power lighting frequency signal f2 and the low frequency signal f3 are outputted by turns from the selector 51e. When the output of the selector 51e is given to the switching elements Q1-Q4 of the full bridge circuit 2 through the driver 4, although the switching elements Q1-Q4 are driven by the small electric power lighting frequency signal f2 (60-1000 Hz) at the time of the small electric power lighting, they are driven at the low frequency signal f3 (5-200 Hz), whose frequency is lower than the steady state lighting frequency, every first predetermined time (0.01-120 seconds) for the second predetermined period (a period of half cycle to 5 cycles of the low frequency signal). Refer to a waveform "a'" at the time of small electric power lighting of FIG. 6.

Hereafter, the patterns shown in FIGS. 5A, 5B and 5C and FIGS. 6A, 6B and 6C will be explained in detail. In the pattern 1 of FIGS. 5A, 5B and 5C, the discharge lamp 10 is turned on with a waveform (a) at the time of steady state lighting (at the time of the normal mode or economic mode), and then the waveform is changed to a waveform (b) at the time of the small electric power lighting. At the time of steady state lighting, the discharge lamp is lighted by the waveform (a), as shown in FIG. 5A. As shown as the waveform (a), the alternating current of the steady state lighting frequency selected from a range of 60-1000 Hz is supplied to the high voltage discharge lamp. In addition, when frequency which is lower than the steady state lighting frequency and which is selected from a range of 5-200 Hz is defined as "low frequency," alternating current of the "low frequency," whose time length is a half cycle or more to five or less cycle of the low frequency is inserted in the alternating current of the steady state lighting frequency at an interval selected from a range of 0.01-120 seconds (an interval between generation of low frequency and the following generation of the low frequency), so that the alternating current of the low frequency and the alternating current of the steady state lighting frequency are applied by turns so as to turn on the discharge lamp. The concrete example of waveform (a) is shown in Table 1.

TABLE 1

| Waveform (a) in steady state lighting | |
|---|---|
| Rated power | 230 W, 96 V, 2.4 A |
| Frequency of alternating current with steady state lighting frequency | 370 Hz |
| Frequency of alternating current with low frequency | 46.25 Hz |
| Time length of alternating current of low frequency | 1 cycle |
| An interval between generation of alternating current of low frequency and the following generation of alternating current of low frequency | 0.1 second |

And the lamp is turned on by the waveform (b) at time of the small electric power lighting with electric power smaller than that at the time of the steady state lighting. The waveform (b) includes an alternating current of the small electric power lighting frequency which is selected from the range of 60-1000 Hz, is supplied. In addition, direct current is supplied to a high pressure discharge lamp for time (direct current lighting period) selected from a range of 0.2-5 seconds at an interval of the direct current lighting, which is selected from the range of 1-100 seconds, (an interval between generation of direct current and the following generation of direct current), so that alternating current of the small electric power lighting frequency and the direct current are supplied by turns so as to light the discharge lamp. Details of the waveform (b) are shown in Table 2.

TABLE 2

| Waveform (b) in small electric power lighting | |
|---|---|
| Electric power | 140 W, 73.5 V, 1.9 A |
| Frequency of alternating current with small electric power lighting frequency | 500 Hz |
| Time length of direct current | 1 second |
| An interval between generation of direct current and the following generation of direct current | 4 seconds |

When electric power at the time of steady state lighting ("normal mode") is defined as 100% of rated power, electric power at time of power saving lighting is in a range of, for example, 60%-40% of the rated power. If a dimming range in one lamp is large, it is possible to display a clear image in a bright place by turning on the lamp with high electric power. In addition, it is possible to save energy in a dark place, by turning on the lamp with low electric power, and it is possible to reduce cooling function. Therefore, a reduced noise design (silent design) can be possible if the dimming range is large. Moreover, an image with a high contrast ratio can be displayed by continuously adjusting lighting electric power according to the image to be displayed. On the other hand, if electric power becomes 40% or less of that in the steady state lighting (normal mode), it becomes difficult to maintain lighting of the lamp.

At time of steady state lighting (at time of the normal mode or economic mode), the discharge lamp 10 is turned on with the waveform (a) in the pattern 2 of FIGS. 6A, 6B and 6C, and it is first changed to the waveform (b) at the time of small electric power lighting, and then the lamp is turned on in the pattern of the waveform (a'). In the pattern 2, the lamp is turned on with the waveform (a) at the time of steady state lighting. This waveform (a) is the same as the waveform (a) of the pattern 1. And the lamp is turned on by the waveform (b) at time of the small electric power lighting with electric power which is smaller than that at the time of steady state lighting. This waveform (b) is the same as the waveform (b) of the pattern 1. By this waveform (b), a second projection is formed on an electrode at time of small electric power lighting. If the small electric power lighting continues for a long time, for example, three hours or more, and lighting is continuously carried out with this waveform (b) for three hours or more, the second projection may deform. The deformation occurs because, after the second projection is formed, if the lighting continues with the waveform (b), the temperature at the tip of the electrode becomes high so that there is more evaporation than the amount of tungsten which returns to the electrode by the halogen cycle. Although the second projection begins to deform, if the lighting continues as it is, a flicker begins to occur. Thus, since the voltage value also begins to rise when the second projection begins to deform, the lamp is turned on by the waveform (a') when the voltage value exceeds the threshold.

This waveform (a') falls in the waveform range at the time of steady state lighting, and alternating current of the frequency selected from the range of 60-1000 Hz is supplied, as alternating current of the second small electric power lighting frequency, to the high pressure discharge lamp. In addition, when frequency which is lower than the second small electric power lighting frequency and which is selected from a range of 5-200 Hz is defined as "low frequency," alternating current of the "low frequency," whose length is a half cycle or more to five or less cycle of the low frequency is applied at an interval selected from a range of 0.01-120 seconds (an interval from time low frequency is generated until the following low frequency is generated) with respect to the second small electric power lighting frequency, so that the alternating current of the low frequency and the alternating current of the second small electric power lighting frequency are applied by turns so as to turn on the discharge lamp. Thus, such deformation of the electrode can be controlled if the lamp is turned on with the waveform (a') at the time of small electric power. In addition, the volume of the second projection of the electrode is very small, and a decrease in temperature of the second projection is small and further thermionic emission fully functions, so that an arc starting point is stabilized and a Flicker can be prevented. Specifically, the waveform (a') is different from the waveform (a) in that only electric power thereof differs from each other. The lighting frequency, the low frequency, and the length of low frequency and the low frequency supply interval are all the same as those of the waveform (a). Detail of the waveform (a') is shown in Table 3. In addition, the pattern of FIGS. 6A, 6B and 6C shows an example of a patter applied where small electric power lighting continues for a long time, and it is also deemed that similar effect can be acquired in other patterns.

TABLE 3

Waveform (a') in small electric power lighting

| | |
|---|---|
| Electric power | 140 W, 73.5 V, 1.9 A |
| Frequency of alternating current with second small electric power lighting frequency | 370 Hz |
| Frequency of alternating current with low frequency | 46.25 Hz |
| Time length of alternating current of low frequency | 1 cycle |
| An interval between generation of alternating current of low frequency and the following generation of alternating current of low frequency | 0.1 second |

Next, lighting parameters of the present invention at the time of small electric power lighting is described below. When the high pressure discharge lamp was operated in the small electric power lighting at the small electric power lighting frequency of 60 Hz or less or 1000 Hz or more, the flicker occurred. It is thought that, since the frequency is low when the cycle is 60 Hz or less, the temperature of the electrode falls too much while one electrode serves as a cathode, so that the temperature of the electrode cannot fully be raised even if the electrode serves as an anode next time, whereby an arc luminescent spot is not stabilized and a flicker occurs. Moreover, since it is viewed as a flicker by human's eyes when it is 60 Hz or less so that it is not practical. On the other hand, it is considered that since a period per one pulse is too short when it is 1000 Hz or more, the polarity thereof is reversed before the temperature of the electrode fully goes up, so that such a flicker occurs.

Moreover, also in case of a direct current lighting whose period is 0.2 seconds or less, or whose interval is 100 seconds or more, the temperature of the electrode cannot be fully raised, so that a flicker occurs. On the other hand, when the direct current lighting whose period is 5 seconds or more, or whose interval is 1 second or less, since the temperature of the electrode is too high, the second projection may not be formed, and in some cases, even the first projection may disappear depending on the conditions.

For such a reason, while alternating current of frequency selected from the range of 60-1000 Hz which is the small electric power lighting frequency, is supplied, direct current whose direct current lighting period is in a range for 0.2-5 seconds and whose interval is selected from the range which is 1-100 seconds, is supplied, so that the alternating current and the direct current by turns are supplied, whereby no flicker occurs and a good lighting state can be obtained.

In order to determine the numerical range of the lighting parameter of the present invention, the lighting conditions were changed so as to exam the existence of a flicker. FIG. 7 shows an evaluation result (1) in case of a lighting operation of the lighting waveform (a) of FIG. 5A in the steady state lighting, wherein an evaluation in case of changing lighting electric power as a parameter is shown. As shown in this figure, when a lamp is lighted on the lighting electric power of 230 W (rated power ratio: 100%) and lighting electric power of 184 W (rated power ratio: 80%), at steady state lighting frequency of 370 Hz and low frequency of 46.25 Hz, whose time length is one (1) cycle, at an interval of 0.1 second, from generation of the low frequency to generation of the following low frequency, respectively, no flicker occurred, a first projection was formed as indicated as "Yes", a second projection was not formed as indicated as "No", and electrodes were not deformed as indicated as "No", so that the judgment was "Good," respectively.

FIG. 8 shows evaluation results (2)-(8) in case where a lamp was lighted with the lighting waveform (b) of FIG. 5B in a small electric power lighting operation. In the cases of (2)-(6), lighting electric power and small electric power lighting frequency were changed as parameters. In the case of (7), direct current lighting time was changed as a parameter. In the case of (8), an interval between generation of direct current and generation of the following direct current was changed as a parameter. In addition, in the case of (2) of the figure, a lamp was respectively lighted on lighting electric power of 184 W (rated power ratio: 80%), lighting electric power of 138 W (rated power ratio: 60%), lighting electric power of 92 W (rated power ratio: 40%) and lighting electric power of 81 W (rated power ratio: 35%), at small electric power lighting frequency of 50 Hz, providing direct current for lighting time of 1 second at an interval of 4 seconds between generation of direct current and the following generation of direct current. In this case, as shown in this figure, a flicker occurred, a first projection was formed as indicated as "Yes," a second projection was not formed as indicated as "No," and electrodes were deformed as indicated as "Yes", respectively, so that the judgment was no-good as indicated "NG," respectively. In this case, small electric power lighting frequency is low, so that an electrode tip cannot be melted in direct current lighting since one electrode gets cold while inverting.

In the case of (3) of this figure, a lamp was lighted on the same lighting electric power as that in the case of (2), at small electric power lighting frequency of 60 Hz, providing direct current for lighting time of 1 second at an interval of 4 seconds between generation of direct current and the following generation of direct current. As shown in this figure, except that lighting electric power was 81 W, in all the lighting operations of the case (3), no flicker occurred as indicated as "No", a first projection was formed as indicated as "Yes," a second projection was formed as indicated as "Yes," and electrodes were not deformed as indicated as "No," so that the judgment was good as indicated as "Good," respectively. However, in the case where the lighting electric power was 81 W, a flicker occurred as indicated as "Yes," a first projection was formed as indicated as "Yes," a second projection was not formed as indicated as "No," and electrodes were deformed as indicated as "Yes," so that the judgment was no-good as indicated as "NG." Thus, if the lighting electric power turned into 35% of the rated power, the electrode tip could not be melted even if direct current lighting time was provided.

In the case of (4), a lamp was lighted on the same lighting electric power as that in the case of (2), at small electric power lighting frequency of 500 Hz, providing direct current for lighting time of 1 second at an interval of 4 seconds between generation of direct current and the following generation of direct current. As shown in this figure, except that the lighting electric power was 81 W, in all the operations of the case (4), no flicker occurred as indicated as "No," a first projection was formed as indicated as "Yes," a second projection was formed as indicated as "Yes," and electrodes were not deformed as indicated as "No," so that the judgment was good as indicated as "Good," respectively. In the case where lighting electric power was 81 W, a flicker occurred as indicated as "Yes," a first projection was formed as indicated as "Yes," a second projection was not formed as indicated as "No," and electrodes were deformed as indicated as "Yes," so that the judgment was no-good, as indicated as "NG." As in the case (3), when lighting electric power turned into 35% of the rated power, an electrode tip could not be melted, even if the direct current lighting time was provided. In the case (5) of this figure, a lamp was lighted on the same lighting electric power as that in the case (2), at small electric power lighting frequency of 1000 Hz, providing direct current for lighting time of 1 second at an interval of 4 seconds between generation of direct current and the following generation of direct current. As shown in this figure, except that the lighting electric power was 81 W, in all the operations of the case (5), no flicker occurred as indicated as "No," a first projection was formed as indicated as "Yes," a second projection was formed as indicated as "Yes," and electrodes were not deformed, so that the judgment was good as indicated as "Good," respectively. However, in the case where the lighting electric power was 81 W, a flicker occurred as indicated as "Yes," a first projection was formed as indicated as "Yes," a second projection was not formed as indicated as "No," and electrodes were deformed as indicated as "Yes," so that the judgment was no-good as indicated as "NG." As in the cases (3) and (4), when lighting electric power turned into 35% of the rated power, an electrode tip could not be melted, even if direct current lighting time was provided.

In the case of (6) of this figure, a lamp was lighted on the same lighting electric power as that in the case of (2), at small electric power lighting frequency of 1100 Hz, providing direct current for lighting time of 1 second at an interval of 4 seconds between generation of direct current and the following generation of direct current. As shown in this figure, a flicker occurred as indicated as "Yes," a first projection was formed as indicated as "Yes," a "second projection was not formed as indicated as "No," and electrodes were deformed as indicated as "Yes," so that the judgment was no-good, as indicated as "NG," respectively. In this case, since the small electric power lighting frequency is high, the polarity was inverted before the electrode warmed up, so that there was no keeping-warm effect and an electrode tip could not be melted even in the direct current lighting.

In the case of (7) of this figure, a lamp was lighted on lighting electric power of 92 W (the rated power ratio: 40%), at small electric power lighting frequency of 500 Hz, providing direct current while changing lighting time of 0.1 second, 0.2 seconds, 5 seconds, and 6 seconds, at an interval 4 seconds between generation of direct current and the following generation of direct current. As shown in this figure, when the direct current lighting time was 0.1 second, a flicker occurred as indicated as "Yes," a first projection was formed as indicated as "Yes," a second projection was not formed as indicated as "No," and electrodes were deformed as indicated as "Yes," so that the judgment was no-good as indicated as "NG." When direct current lighting time was 6 seconds, a flicker occurred as indicated as "Yes," a first projection was not formed as indicated as "No," a second projection was not formed as indicated as "No," and electrodes were deformed as indicated as "Yes," so that the judgment wad no-good as indicated as "NG." However, when the direct current lighting time was 0.2 seconds, and 5 seconds, a flicker did not occur as indicated as "No," a first projection was formed as indicated as "Yes," a second projection was formed as indicated as "Yes," and electrodes were not deformed as indicated as "No," so that the judgment was good as indicated as "Good," respectively. In this case, when the direct current lighting time was 0.1 second, since the period during which an electrode was warmed was short, an electrode tip could not be melted. On the other hand, when it was 6 seconds, since the period during which an electrode was warmed was too long, the first projection was also melted, so that the judgment was no-good.

In the case of (8) of this figure, a lamp was lighted on the same lighting electric power as that in the case of (2), at small electric power lighting frequency of 500 Hz, providing direct current for lighting time of 1 second while changing intervals between generation of direct current and generation the following direct current, as 0.5 seconds, 1 second, 100 seconds, and 110 seconds. As shown in this figure, when the interval between generation of direct current and the following generation of direct current was 0.5 seconds, a flicker occurred as indicated as "Yes," a projection was not formed as indicated as "No," a second projection was not formed as indicated as "No," and electrodes were deformed as indicated as "Yes," so that the judgment was no-good as indicated as "NG." In the case where the interval between generation of direct current and the following generation of direct current was 110 seconds, a flicker occurred as indicated as "Yes," a projection was formed as indicated as "Yes," and a second projection was not formed as indicated as "No," and electrodes were deformed as indicated as "Yes," so that the judgment was no-good as indicated as "NG." However, when the intervals between generation of direct current and the following generation of direct current were 1 second and 100 seconds, a flicker did not occur as indicated as "No," a first projection was formed as indicated as "Yes," a second projection was formed as indicated as "Yes," and electrodes were not deformed as indicated "No," so that the judgment was good as indicated as "Good," respectively. In this case, when a period between generation of direct current and the following generation of direct current was 0.5 seconds, the electrodes were warmed frequently so that the first projection was melted. On the other hand, when it was 110 seconds, since the interval during which the electrodes were warmed was too long, the electrode tip could not be melted even if the direct current lighting time was provided.

In the above embodiments, description of the current waveform patterns at the time of the steady state lighting time (where the lamp is turned on with electric power larger than 80% of the rated power) and at the time of the small electric power lighting (where the lamp was turned on with 80% or less of electric power of rated power) is given. However, in a brightness adjustment mode using a dimming function (in which an input electric power to the lamp is controlled so as to be low according to a screen in order to raise a contrast ratio), the lamp can be stably turned on by lighting the lamp with the current waveform at the time of the small electric power lighting.

The preceding description has been presented only to illustrate and describe exemplary embodiments of the present high pressure discharge lamp lighting apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A high pressure discharge lamp lighting apparatus comprising:
   a high pressure discharge lamp including a pair of electrodes, in which the electrodes are arranged so as to face each other at an interval of 2.0 mm or less in an electric discharge container made of quartz glass, a first projection is formed at a tip for one of the electrodes, and a different first projection is formed at a tip for a different one of the electrodes, wherein 0.20 mg/mm3 or more of mercury and halogen in a range of 10-6 to 10-2 µmol/mm3 is enclosed in the electric discharge container; and
   a power supply apparatus which supplies an alternating current to the high pressure discharge lamp, wherein in a steady state lighting operation: an alternating current of a steady state lighting frequency and alternating current of a low frequency are supplied to the high pressure discharge lamp, the steady state lighting frequency is selected from a range of 60-1000 Hz, the low frequency is lower than the steady state lighting frequency of the alternating current, and is selected from a range of 5-200 Hz, a time length of the low frequency of the alternating current is a half cycle thereof or more and five cycles thereof or less, and an interval between generation of the alternating current of low frequency and the following generation of the alternating current of the low frequency is in a range of 0.01-120 seconds, and wherein in a small electric power lighting in which electric power to be applied is smaller than that of the steady state lighting: alternating current of a small electric power lighting frequency and direct current are supplied to the high pressure discharge lamp, the small electric power lighting frequency is selected from a range of 60-1000 Hz, a time length of the direct current is in a range of 0.2-5 seconds, an interval between generation of the direct current and the following generation of direct current is in a range of 1-100 seconds, a second projection protrudes from the first projection when the direct current applied to the electrodes is of a polarity, and a different second projection protrudes from the different first projection when the direct current applied to the electrodes is opposite to the polarity: and wherein the second projection and the different second projection disappear when the operation is changed to the normal mode or economic mode, since the temperature of the electrodes rises with a rise of electric power. After that, the second projection 22 is again formed by the above mentioned mechanism when the operation is changed from the small electric power lighting to the steady state lighting operation.

* * * * *